United States Patent [19]

Funahashi et al.

[11] Patent Number: 4,987,798
[45] Date of Patent: Jan. 29, 1991

[54] HYDRAULIC CONTROL DEVICE FOR AUTOMATIC TRANSMISSION FOR VEHICLE WITH HIGH ACCURACY REVERSE INHIBITION SYSTEM

[75] Inventors: Makoto Funahashi; Hiroshi Itoh, both of Toyota; Tokuyuki Takahashi, Aichi; Mitsuru Takada, Toyota, all of Japan

[73] Assignee: Toyota Jidosha Kabushiki Kaisha, Toyota, Japan

[21] Appl. No.: 388,611

[22] Filed: Aug. 2, 1989

[30] Foreign Application Priority Data

Aug. 2, 1988 [JP] Japan ............................ 63-192965
Sep. 22, 1988 [JP] Japan ............................ 63-238146
Sep. 22, 1988 [JP] Japan ............................ 63-238145

[51] Int. Cl.$^5$ ............................................ B60K 41/06
[52] U.S. Cl. ........................................ 74/868; 74/878
[58] Field of Search ............... 74/866, 867, 868, 878, 74/869

[56] References Cited

U.S. PATENT DOCUMENTS

| | | | |
|---|---|---|---|
| 3,937,107 | 2/1976 | Lentz ............................ | 74/868 X |
| 4,027,554 | 6/1977 | Ito et al. ........................ | 74/866 |
| 4,033,203 | 7/1977 | Hirosawa et al. .............. | 74/869 |
| 4,134,313 | 1/1979 | Ishikawa ....................... | 74/867 |
| 4,136,584 | 1/1979 | Ishikawa ....................... | 74/867 |
| 4,412,461 | 11/1983 | Windsor ....................... | 74/866 |
| 4,744,269 | 5/1988 | Greene et al. ................. | 74/868 |
| 4,817,473 | 4/1989 | Baltusis et al. ................ | 74/869 |
| 4,841,816 | 6/1989 | Bullock ......................... | 74/866 |

FOREIGN PATENT DOCUMENTS 60-37446 2/1985 Japan.

Primary Examiner—Dwight Diehl
Attorney, Agent, or Firm—Oblon, Spivak, McClelland, Maier & Neustadt

[57] ABSTRACT

A hydraulic control device having a reverse inhibition system and applicable to an automatic transmission for a vehicle of a type including a friction engaging means for a reverse stage having a reverse exclusive hydraulic pressure chamber adapted to be supplied with a hydraulic pressure only for setting up the reverse stage, the reverse inhibition system having a reverse inhibition valve biased to a reverse inhibition position by a control hydraulic pressure for interrupting supply of hydraulic pressure to the reverse exclusive hydraulic pressure chamber and to a reverse allowance position by a hold hydraulic pressure for allowing the supply of hydraulic pressure to the reverse exclusive hydraulic pressure chamber, wherein the hydraulic pressure supplied to the reverse exclusive hydraulic pressure chamber is used for the hold hydraulic pressure.

3 Claims, 2 Drawing Sheets

HYDRAULIC CONTROL DEVICE FOR AUTOMATIC TRANSMISSION FOR VEHICLE WITH HIGH ACCURACY REVERSE INHIBITION SYSTEM

BACKGROUND OF THE INVENTION

1. Field of the Invention

The present invention relates to a hydraulic pressure control device for an automatic transmission for a vehicle such as an automobile, and more particularly, to a hydraulic control device equipped with a reverse inhibition mechanism for inhibiting that a reverse stage is set up by malfunction of the hydraulic control device.

2. Description of the Prior Art

In the art of automatic transmission for a vehicle such as an automobile it has already been proposed as described in, for example, Japanese Patent Laying-open Publication 60-37446 to incorporate a reverse inhibition mechanism in a hydraulic control device for the automatic transmission so as to inhibit that the reverse stage is set up by an erroneous manual shifting of a manual shift valve to a reverse range by the driver during forward running of the vehicle.

Such a reverse stage inhibition mechanism has a reverse stage inhibition valve generally called a reverse inhibition valve for selectively communicating or interrupting a hydraulic pressure supply passage for a hydraulic pressure chamber of a friction engaging means for setting up the reverse stage. Such a reverse inhibition valve has a valve element movable between a permission position for communicating said hydraulic pressure supply passage and an inhibition position for interrupting said hydraulic pressure supply passage, said valve element being adapted to be driven by a hydraulic pressure supplied to an inhibition port thereof so as to inhibit the setting up of the reverse stage.

Further, in order to prevent that said valve element moves to said inhibition position by an erroneous operation when once the setting up of the reverse stage has been allowed, it is contemplated to hold said valve element at said permission position, as proposed in patent application Ser. No. 07/302,256 assigned to the same assignee as that of the present application.

When the friction engaging means supplied with a hydraulic pressure for setting up the reverse stage is also supplied with a hydraulic pressure for setting up a forward speed stage such as the first speed stage, if in a speed stage shifting from the first speed stage to the reverse stage by operation of a manual shift valve the exhausting of the hydraulic pressure from the friction engaging means delays, the valve element for controlling allowance and inhibition of the reverse stage will be held at its allowance position by the hydraulic pressure for the first speed stage even when the reverse inhibition operation is to be obtained.

SUMMARY OF THE INVENTION

In view of the above-mentioned problem it is the object of the present invention to provide a hydraulic control device for an automatic transmission for a vehicle such as an automobile which can inhibit the setting up of the reverse stage when required at high accuracy.

According to the present invention, the above-mentioned object is accomplished by a hydraulic control device for an automatic transmission for a vehicle such as an automobile of a type including a friction engaging means for a reverse stage having a reverse exclusive hydraulic pressure chamber adapted to be supplied with a hydraulic pressure only for setting up the reverse stage, comprising a passage for supplying a hydraulic pressure to said reverse exclusive hydraulic pressure chamber, and a reverse inhibition valve having a valve element, an inhibition port adapted to be supplied with a hydraulic pressure when reverse inhibition is required for biasing said valve element toward an inhibition position for interrupting said passage, and a hold port adapted to be supplied with a hydraulic pressure for biasing said valve element toward an allowance position opposite to said inhibition position for communicating said passage, wherein said hold port is adapted to be supplied with a hydraulic pressure in said reverse exclusive hydraulic pressure chamber.

The hydraulic control device according to the above construction may further comprise a delay means for delaying the supply of hydraulic pressure to said hold port. Such a delay means may be a throttling means provided in said passage.

When the automatic transmission further comprises a second friction engaging means for a speed stage other than the reverse stage having a second hydraulic pressure chamber adapted to be supplied with a hydraulic pressure for setting up said second speed stage, the hydraulic control device according to the present invention may comprise a second passage for supplying a hydraulic pressure to said second hydraulic pressure chamber, and said reverse inhibition valve may further control said second passage so as to interrupt said second passage when said valve element is shifted to said inhibition position and to communicate said second passage when said valve element is shifted to said allowance position.

DESCRIPTION OF THE PREFERRED EMBODIMENT

In the following the invention will be described in more detail with respect to a preferred embodiment thereof with reference to the accompanying drawings.

Figure 1:
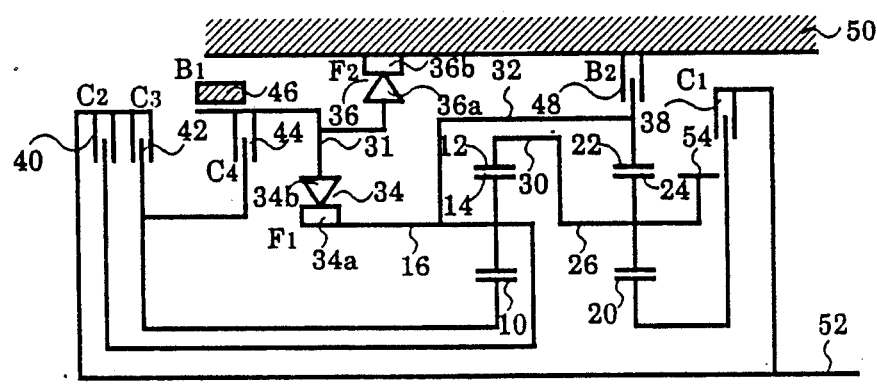
FIG. 1 is a skeleton diagram showing an example of a planetary gear type speed change device for an automatic transmission for a vehicle to which the hydraulic control device according to the present invention is applicable.

Referring to FIG. 1, the speed stage shifting mechanism herein shown comprises a first planetary gear mechanism having a first sun gear 10, a first ring gear 12 coaxial with said first sun gear 10, a first planetary pinion 14 meshing with said first sun gear 10 and said first ring gear 12, and a first carrier 16 rotatably supporting said first planetary pinion 14, and a second planetary gear mechanism having a second sun gear 20, a second ring gear 22 coaxial with said second sun gear 20, a second planetary pinion 24 meshing with said second sun gear 20 and said second ring gear 22, and a second carrier 26 rotatably supporting said second planetary pinion 24. The first ring gear 12 is connected with the second carrier 26 by a connecting member 30. The first carrier 16 is connected with the second ring gear 22 by a connecting member 32.

A first one way clutch 34 and a second one way clutch 36 are provided in series between a housing 50 and the first carrier 16 which is also connected with the second ring gear 22 by the connecting member 32. The first one way clutch 34 is closer to the first carrier 16 and the second one way clutch 36 is closer to the housing 50. In more detail, the first one way clutch 34 has an inner race 34a connected with the first carrier 16 and an outer race 34b connected via a connecting member 31 with an inner race 36a of the second one way clutch which also has an outer race 36b connected with the housing 50. The first one way clutch 34 is engaged when the outer race 34b would rotate relative to the inner race 34a in in a first rotational direction and slips when the inner race 34a rotates relative to the outer race 34b in a second direction opposite to said first direction. Similarly, the second one way clutch 36 is engaged when the inner race 36a would rotate relative to the outer race 36b in said first direction and slips when the inner race 36a rotates relative to the outer race 36a in said second direction.

The second carrier 26 is connected with an annular gear member 54 which operates as an output rotational member of this speed stage shifting mechanism.

A first clutch 38 is provided between the second sun gear 20 and an input shaft 52 for selectively connecting these two members with one another. A second clutch 40 is provided between the first carrier 16 and the input shaft 52 for selectively connecting these two members with one another. A third clutch 42 is provided between the first sun gear 10 and the input shaft 52 for selectively connecting these two members with one another. A fourth clutch 44 is provided between the first sun gear 10 and the connecting member 31 for selectively connecting the sun gear 10 with the outer race 34b of the one way clutch 34 and the inner race 36b of the one way clutch 36.

A first brake 46 is provided between the connecting member 31 and the housing 50 for selectively fixing the connecting member 31 relative to the housing 50. A second brake 48 is provided between the combination of the second ring gear 22 and the first carrier 16 and the housing 50 for selectively fixing the second ring gear 22 and the first carrier 16 with respect to the housing 50.

Figure 2:
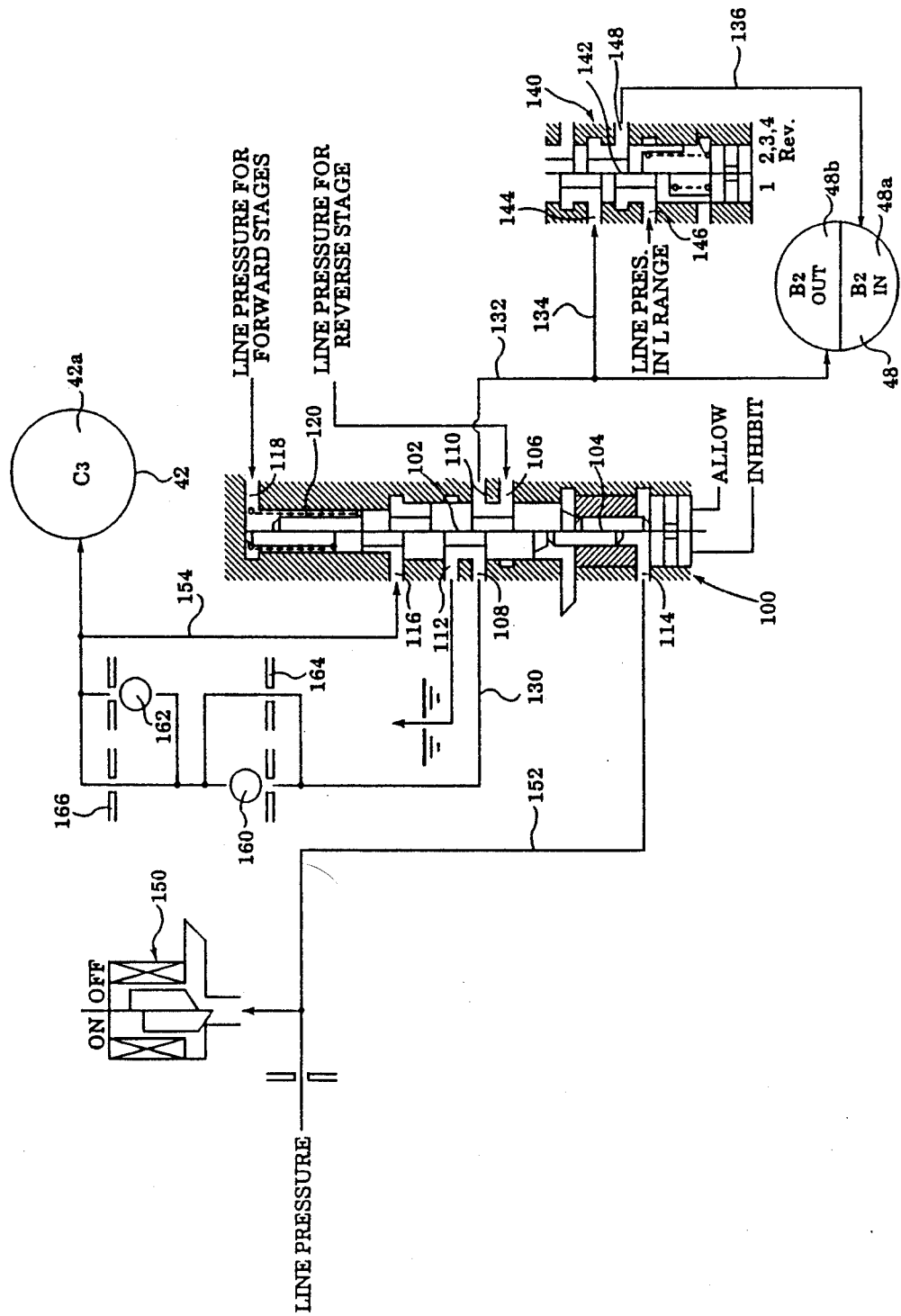
FIG. 2 is a schematic diagram showing essential portions of an embodiment of the hydraulic control device according to the present invention.

The manner of providing a first speed stage, a second speed stage, a third speed stage (direct connection stage), a fourth speed stage (overdrive stage) and a reverse stage is shown in Table 1 and FIG. 2. In Table 1 and FIG. 2 a circle (O) indicates that the corresponding clutch, brake or one way clutch is engaged in engine drive state, and in Table 1 a circle in parentheses ((O)) indicates that the corresponding clutch or brake is engaged to provide the corresponding speed stage, with the effect of engine braking.

When the ratio of the number of gear teeth of the first ring gear 12 to that of the first sun gear 10 is $r_1$, and the ratio of the number of gear teeth of the second ring gear 22 to that of the second sun gear 20 is $r_2$, speed change gear ratios at the respective speed stages are as shown in Table 2.

The first clutch 38, the second clutch 40, the third clutch 42, the fourth clutch 44, the first brake 46 and the second brake 48 are all of a hydraulically operating type having, as shown in FIG. 3, hydraulic pressure chambers 38a, 40a, 42a, 44a, 46a and 48a plus 48b, respectively, and are adapted to be engaged when a hydraulic pressure is supplied to the hydraulic pressure chambers and are disengaged when the hydraulic pressure has been exhausted from the hydraulic pressure chambers.

The input shaft 52 of the above-mentioned planetary gear type speed change device is drivingly connected with a motor such as an internal combustion engine not shown in the figure via a fluid torque converter 60 such as shown in FIG. 3.

In the above-mentioned construction, a hydraulic pressure chamber 42a of the third clutch 42 and an outside hydraulic pressure chamber 48b of the second brake 48 are the hydraulic pressure chambers to be supplied with a hydraulic pressure only in the reverse stage.

FIG. 2 shows an essential portion of an embodiment of the hydraulic pressure control device according to the present invention.

In FIG. 2 100 designates a spool type reverse inhibition valve which comprises a valve element 102, a plug 104, a reverse port 106 to be supplied with a line pressure when a manual shift valve is set to a reverse range, a clutch port 108 connected through a passage 130 with the hydraulic pressure chamber 42a of the third clutch 42 for setting up the reverse stage, a brake port 110 connected through a passage 132 with the outside hydraulic pressure chamber 48b of the second brake 48 for setting up the reverse stage and also connected through a passage 134 with a 1-2 shift valve 140 and further through a passage 136 with an inside hydraulic pressure chamber 48a of the second brake 48, a drain port 112, an inhibition port 114, a hold port 116, another hold port 118, and a compression coil spring 120.

The valve element 102 and the plug 104 are movable between a permission position shown in the right half portion thereof in the figure where the valve element closes the drain port 112 and connects the clutch port 108 and the brake port 110 with the reverse port 106 and an inhibition position shown in the left half portion thereof in the figure where the valve element closes the reverse port 106 and connects the clutch port 108 and the brake port 110 with the drain port 112. The valve element and the plug are driven toward said permission position by the spring force of the compression coil spring 120 and a hydraulic pressure supplied to the hold port 116 or 118, while they are driven toward said inhibition position by a hydraulic pressure supplied to the inhibition port 114.

The inhibition port 114 is selectively supplied with a line pressure through a passage 152 according to opening or closing of an electromagnetic drain valve 150. In this embodiment the electromagnetic drain valve 159 is a normally opened type valve which is closed when it is energized to supply the line pressure to the inhibition port 114.

The electromagnetic drain valve 150 is energized when it is necessary to inhibit the setting up of the reverse stage although the manual shift valve was set by a driver to the reverse range, as in such a condition that the vehicle is running forward at a speed higher than a predetermined value.

The hold port 116 is connected through a passage 154 with the passage 130. In the passage 130 a parallel connection of a check valve 160 and an orifice 164 and a parallel connection of a check valve 162 and an orifice 166 are provided in series. The passage 154 is connected with the passage 130 at a portion thereof between said combinations of check valves and orifices and the hydraulic pressure chamber 42a. Therefore, the hold port 116 is substantially directly connected with the hydraulic pressure chamber 42a to be supplied with the same hydraulic pressure as the hydraulic pressure chamber 42a.

The orifice 166 controls the speed of rising of the hydraulic pressure in the hydraulic pressure chamber 42a and also delays the rising up of the hydraulic pressure supplied to the hold port 116 so that the hydraulic pressure in the hold port 116 rises up later than the hydraulic pressure in the inhibition port 114.

The hold port 118 is supplied with a line hydraulic pressure when the manual shift valve is shifted to a forward range such as a D range. Therefore, when the manual shift valve is set to a forward range, the valve element 102 and the plug 104 are always held at said permission position even when the line pressure is supplied to the inhibition port 114. Thus it is avoided that the valve element 102 and the plug 104 move undesirably to the reverse inhibition position when the manual shift valve is set to a forward range.

The 1-2 shift valve 140 is a spool type switching over valve having a common construction. A valve element of the 1-2 shift valve 140 is positioned at a descended position as shown in a left half portion thereof in the figure when the first speed stage is set up, while in other speed stages it is positioned at an ascended position as shown in a right half portion thereof in the figure. The base port 148 connected through the passage 136 with the inside hydraulic pressure chamber 48a of the second brake 48 is connected with a port 144 when the valve element 142 is at its ascended position, whereas when the valve element 142 is at its descended position the port 148 is connected with a port 146. The port 144 is connected through the passage 134 with the brake port 110 of the reverse inhibition valve 100. The port 146 is supplied with a line hydraulic pressure when the manual shift valve is shifted to an L range.

Therefore, the outside hydraulic pressure chamber 48b of the second brake 48 is supplied with a hydraulic pressure only in the reverse stage, whereas the inside hydraulic pressure 48a is supplied with a hydraulic pressure in the L range and the reverse range.

When the manual shift valve is shifted to a forward range while the vehicle is running forward, the hold port 118 of the reverse inhibition valve 100 is supplied with the line hydraulic pressure, and therefore the valve element 102 and the plug 104 are held at said permission position.

Starting from the above-mentioned condition, if the manual shift valve is shifted to the reverse range, the line hydraulic pressure in the port 118 is quickly exhausted, and therefore the valve element 102 and the plug 104 are held at the permission position only by the spring force of compression coil spring 120. If at this time the vehicle speed is less than a predetermined value, that is, substantially zero, the electromagnetic drain valve 150 is not energized, and remains opened. Therefore, no hydraulic pressure appears in the inhibition port 114, and the valve element 102 and the plug 104 remain at the permission position under the spring force of the compression coil spring 120. The line hydraulic pressure supplied to the reverse port 106 for setting up the reverse stage is then conducted through the port 108, the passage 130, the check valve 160 and the orifice 166 to the hydraulic pressure chamber 42a of the third clutch 42, while on the other hand it is conducted through the brake port 110 and the passage 132 to the outside hydraulic pressure chamber 48b of the second brake 48 and also through the passage 134, the ports 144 and 148 of the 1-2 shift valve 140 and the passage 136 to the inside hydraulic pressure chamber 48a of the second brake 48, so as thereby to set up the reverse stage.

At the same time the same hydraulic pressure as that existing in the hydraulic pressure chamber 42a of the third clutch 42 is supplied through the passage 154 to the hold port 116, and therefore the valve element 102 and the plug 106 are driven toward said permission position by the spring force of the compression coil spring 120 and also the driving force generated by the hydraulic pressure supplied to the hold port 116. Therefore, even if the line hydraulic pressure is supplied to the inhibition port 114 by an operational error of the electromagnetic drain valve 150, the valve element 102 and the plug 104 are maintained at the permission position and are never erroneously moved to the inhibition position.

When the manual shift valve was shifted to the reverse range when the vehicle is running forward, the hydraulic pressure supplied to the hold port 118 will disappear, while on the other hand, if the vehicle speed is higher than a predetermined value, the electromagnetic drain valve 150 will be energized so that it closes, and then the line hydraulic pressure starts to be supplied to the inhibition port 114. Thereby the valve element 102 and the plug 104 move upward in the figure against the spring force of the compression coil spring 120 to be in the inhibition position as shown in the left half portion thereof in the figure. Then the reverse port 106 is closed, and the clutch port 108 and the brake port 110 are both connected with the drain port 112, and therefore it is inhibited that the hydraulic pressure is supplied to the hydraulic pressure chamber 42a of the third clutch 42 and the inside hydraulic pressure chamber 48a and the outside hydraulic pressure chamber 48b of the second brake 48, so that the setting up of the reverse stage is inhibited.

When the hydraulic pressure in the hold port 118 is exhausted by shifting of the manual shift valve to the reverse range, and when the inhibition hydraulic pressure is supplied to the inhibition port 114, if any hydraulic pressure remains in the hold port 116, the shifting of the valve element 102 and the plug 104 to the inhibition position will be obstructed. However, since the hold port 116 is adapted to be supplied with the hydraulic pressure supplied to the hydraulic pressure chamber 42a of the third clutch 42 which is the friction engaging means engaged only for the reverse stage, it never happens that any hydraulic pressure exists or remains in the hold port 116 when the reverse inhibition is required along with shifting of the manual shift valve to the reverse range, thus ensuring the reverse inhibition operation at high accuracy.

Until the line hydraulic pressure is supplied to the inhibition port 114 and the valve element 102 and the plug 104 are thereby moved to the inhibition position, the hydraulic pressure is supplied through the clutch port 108 and the brake port 110 to the hydraulic pressure chamber 42a of the third clutch 42 and the inside hydraulic pressure chamber 48a and the outside hydraulic pressure chamber 48b of the second brake 48, thereby also supplying the hydraulic pressure to the hold port 116. However, the rising up of the pressure in the hold port 116 is delayed by the orifice 166 to be later than the rising up of the line pressure in the inhibition port 114. By this arrangement it is avoided that the hydraulic pressure in the hold port 116 reaches a high value before the hydraulic pressure in the inhibition port 114 rises up, and thus it is avoided that the valve element 102 and the plug 104 are erroneously held at the permission position when the reverse stage is to be inhibited.

As an alternative, the orifice may be provided in the passage 154. Further, although the hold port 116 is supplied with the hydraulic pressure in the hydraulic pressure chamber 42a of the third clutch 42 in the above described embodiment, the hydraulic pressure to be supplied to the hold port 116 may be a hydraulic pressure in any hydraulic pressure chamber which is supplied with a hydraulic pressure in the reverse stage. Such a hydraulic pressure may be, in the shown embodiment, for example, the hydraulic pressure in the outside hydraulic pressure chamber 48b of the second brake 48. In this case an orifice may be provided in the passage for supplying the hydraulic pressure to the outside hydraulic pressure chamber 48b.

Although the invention has been described in detail with respect to a preferred embodiment thereof, it will be apparent to those skilled in the art that various modifications are possible with respect to such an embodiment within the scope of the present invention.

TABLE 1

| | $C_1$ 38 | $C_2$ 40 | $C_3$ 42 | $C_4$ 44 | $B_1$ 46 | $B_2$ 48 | $F_1$ 34 | $F_2$ 36 |
|---|---|---|---|---|---|---|---|---|
| 1st Speed Stage | 0 | | | | | (0) | 0 | 0 |
| 2nd Speed Stage | 0 | | | 0 | (0) | | | 0 |
| 3rd Speed Stage | 0 | 0 | | 0 | | | 0 | |
| 4th Speed Stage | | 0 | | 0 | 0 | | | |
| Reverse Stage | | | 0 | | | 0 | | |

TABLE 2

| Speed Change Gear Ratio | |
|---|---|
| 1st Speed Stage | $(1 + r_2)/r_2$ |
| 2nd Speed Stage | $\{(1 + r_2)/r_2\} - \{1/r_2(1 + r_1)\}$ |
| 3rd Speed Stage | 1 |
| 4th Speed Stage | $1/(1 + r_1)$ |
| Reverse Stage | $-1/r_1$ |

We claim:

1. A hydraulic control device for an automatic transmission for a vehicle such as an automobile of a type including a first friction engaging means adapted to be supplied with a hydraulic pressure only for setting up a reverse stage and a second friction engaging means adapted to be supplied with a hydraulic pressure for setting up the reverse stage and a certain forward speed stage, comprising:

means for supplying a reverse hydraulic pressure when the reverse stage is to be set up, a first passage means for conducting said reverse hydraulic pressure to said first friction engaging means and including a parallel connection of a throttling means and a check valve oriented to allow fluid to flow only in a direction of exhausting fluid from said first friction engaging means, a second passage means for conducting said reverse hydraulic pressure to said second friction engaging means, and a reverse inhibition valve having a valve element, an inhibition port adapted to be supplied with a control hydraulic pressure when reverse inhibition is required for biasing said valve element toward an inhibition position for interrupting supply of said reverse hydraulic pressure to said first and second passage means, and a hold port adapted to be supplied with said reverse hydraulic pressure supplied to said first friction engaging means after having passed through said throttling means for biasing said valve element toward an allowance position opposite to said inhibition position for transmitting said reverse hydraulic pressure to said first and second passage means.

2. A hydraulic control device according to claim 1, wherein said reverse inhibition valve further comprises a second hold port adapted to be supplied with a hydraulic pressure available when D range is manually selected for biasing said valve element toward said allowance position.

3. A hydraulic control device according to claim 1, wherein said first friction engaging means is a clutch, and said second friction engaging means is a brake adapted to be supplied with a hydraulic pressure when a low speed stage is set up with availability of engine braking.

* * * * *